(12) United States Patent
Leigh-Monstevens

(10) Patent No.: US 7,222,486 B2
(45) Date of Patent: May 29, 2007

(54) DIAPHRAGM ASSEMBLY

(75) Inventor: Keith V. Leigh-Monstevens, Rochester Hills, MI (US)

(73) Assignee: FTE Automotive GmbH, Ebern (DE)

( * ) Notice: Subject to any disclaimer, the term of this patent is extended or adjusted under 35 U.S.C. 154(b) by 10 days.

(21) Appl. No.: 11/158,443

(22) Filed: Jun. 22, 2005

(65) Prior Publication Data

US 2005/0279173 A1  Dec. 22, 2005

Related U.S. Application Data

(60) Provisional application No. 60/582,004, filed on Jun. 22, 2004.

(51) Int. Cl.
*B60T 11/26* (2006.01)
(52) U.S. Cl. .............................. 60/562; 60/585; 73/715
(58) Field of Classification Search ................. 60/562, 60/589, 588, 585; 73/700, 715
See application file for complete search history.

(56) References Cited

U.S. PATENT DOCUMENTS

| | | | | |
|---|---|---|---|---|
| 2,485,752 A | 10/1949 | Lapse et al. | ................. | 103/224 |
| 2,677,393 A | 5/1954 | Cornelius | .................... | 137/796 |
| 3,033,552 A * | 5/1962 | Ogden | ......................... | 267/120 |
| 3,143,144 A | 8/1964 | Peet | .............................. | 138/30 |
| 3,277,925 A | 10/1966 | Sugimura | ..................... | 138/30 |
| 3,357,181 A | 12/1967 | Thirion | ........................ | 60/54.6 |
| 3,473,565 A | 10/1969 | Blendermann | ............... | 137/593 |
| 3,756,367 A | 9/1973 | Mitchell et al. | ............. | 188/352 |
| 4,307,815 A | 12/1981 | Sakazume | .................. | 220/85 B |
| 4,407,125 A | 10/1983 | Parsons | ........................ | 60/584 |
| 4,590,765 A * | 5/1986 | Leigh-Monstevens | ........ | 60/585 |
| 4,893,472 A | 1/1990 | Barker et al. | ................. | 60/562 |
| 4,941,323 A | 7/1990 | Leigh-Monstevens | ........ | 60/589 |
| 4,959,960 A | 10/1990 | LaFountain | ................... | 60/533 |

* cited by examiner

*Primary Examiner*—Andre J. Allen
(74) *Attorney, Agent, or Firm*—YoungBasile PC

(57) ABSTRACT

A diaphragm assembly for use with a hydraulic apparatus. The diaphragm assembly includes a cap formed of a rigid material and a diaphragm formed of an elastomeric material. The diaphragm is generally tubular and includes an upper annular collar portion defining an open upper end of the diaphragm and a main body portion extending downwardly from the collar portion, defining a closed lower end of the diaphragm, and including, in cross-section, a plurality of hollow radially extending circumferentially spaced arms. The cap includes an upper disc portion sized to receive the collar portion of the diaphragm and a rib portion extending downwardly from the disc portion and including, in cross-section, a plurality of radially extending circumferentially spaced arms positioned respectively within the arms of the main body portion of the diaphragm whereby the elastomeric arms of the diaphragm provide large expansion and contraction capacity and the rigid arms of the cap preclude undesired distortion or wrinkling of the flexible arms of the diaphragm.

14 Claims, 4 Drawing Sheets

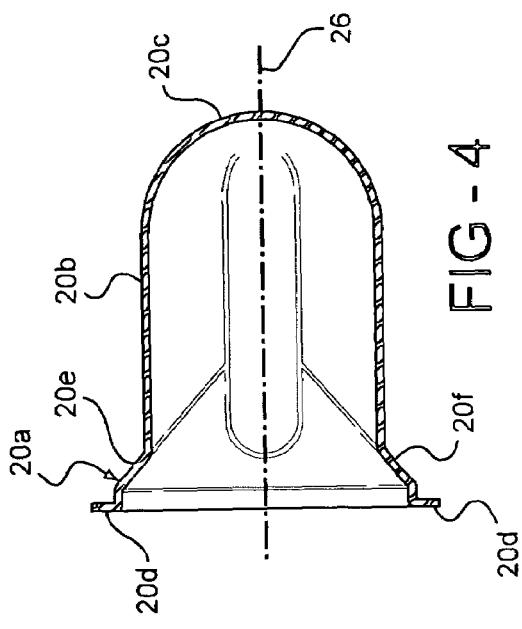
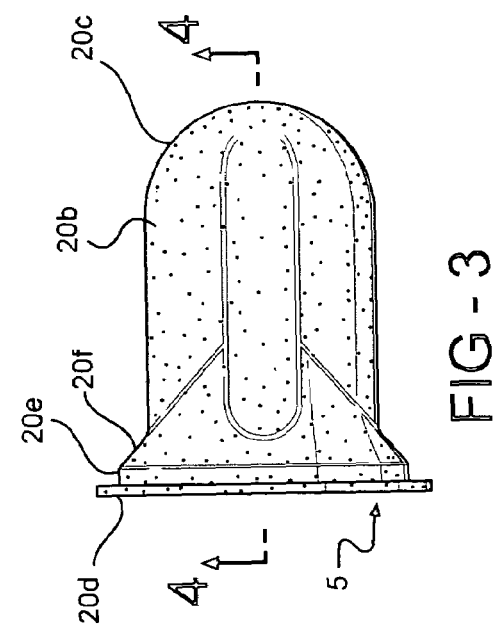
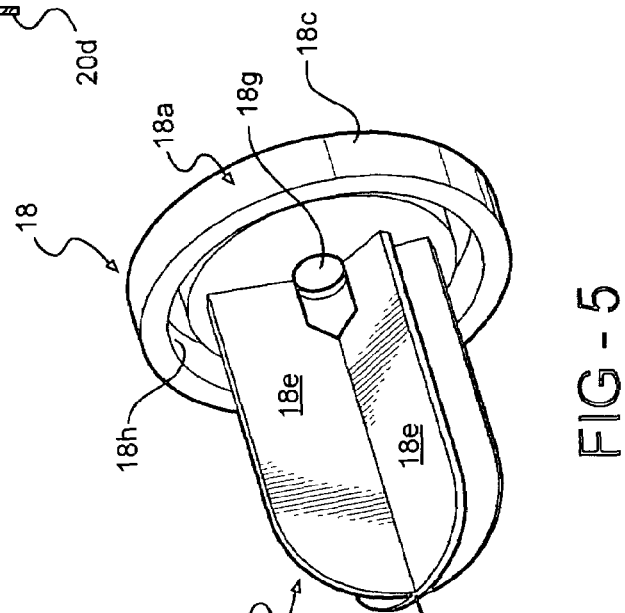
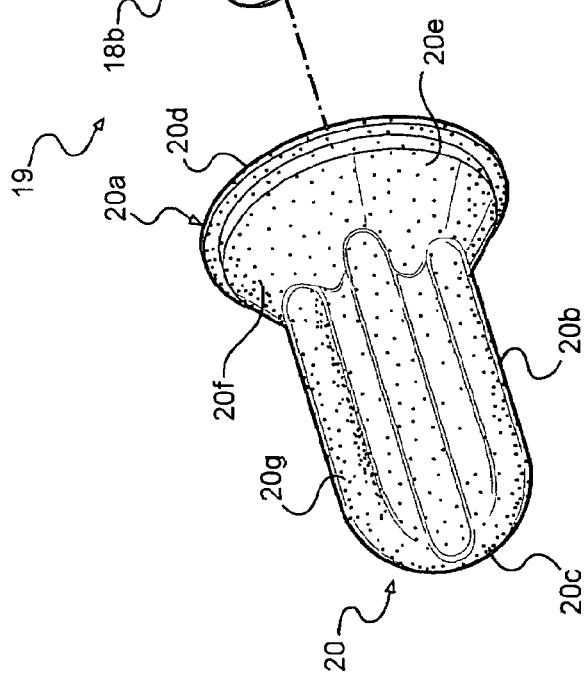
FIG-3
FIG-4
FIG-5

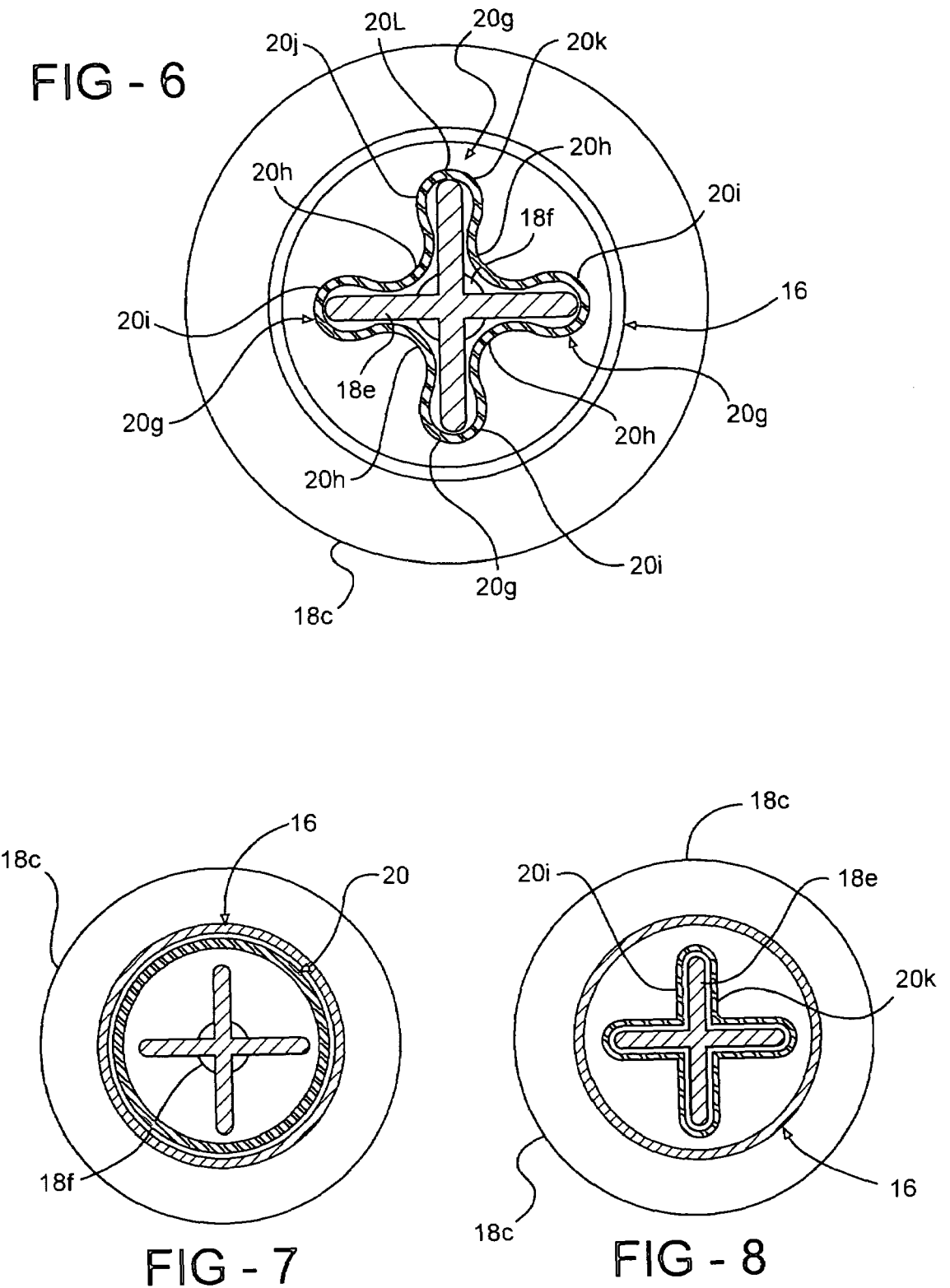

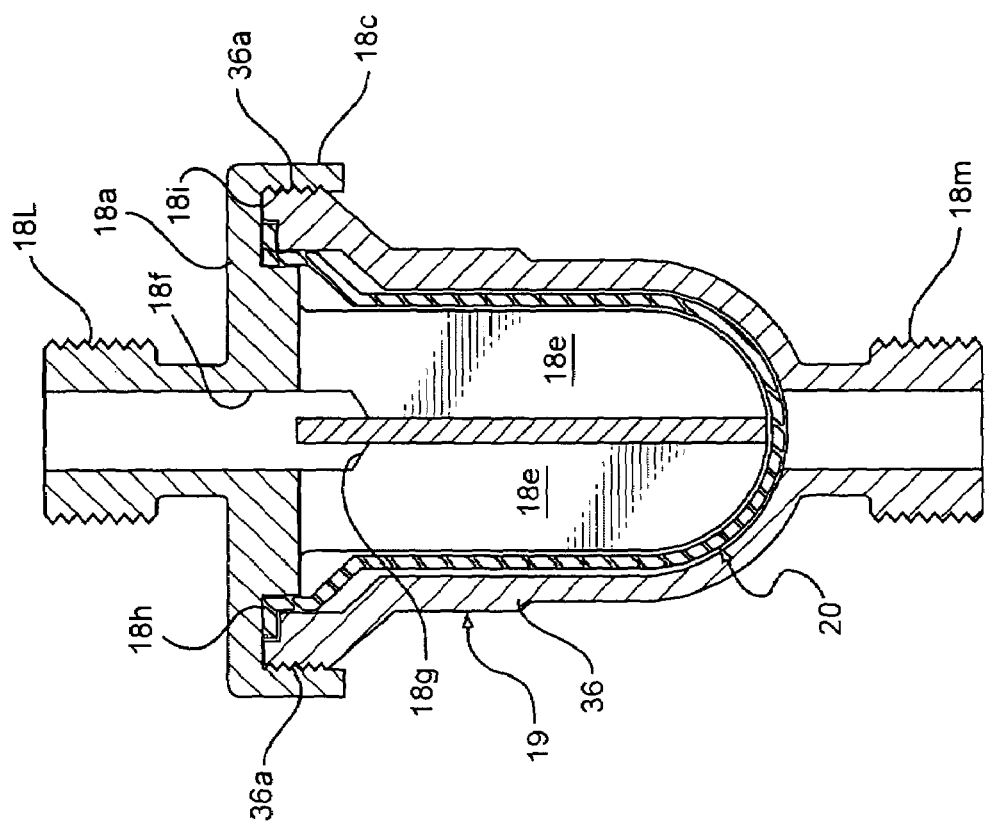
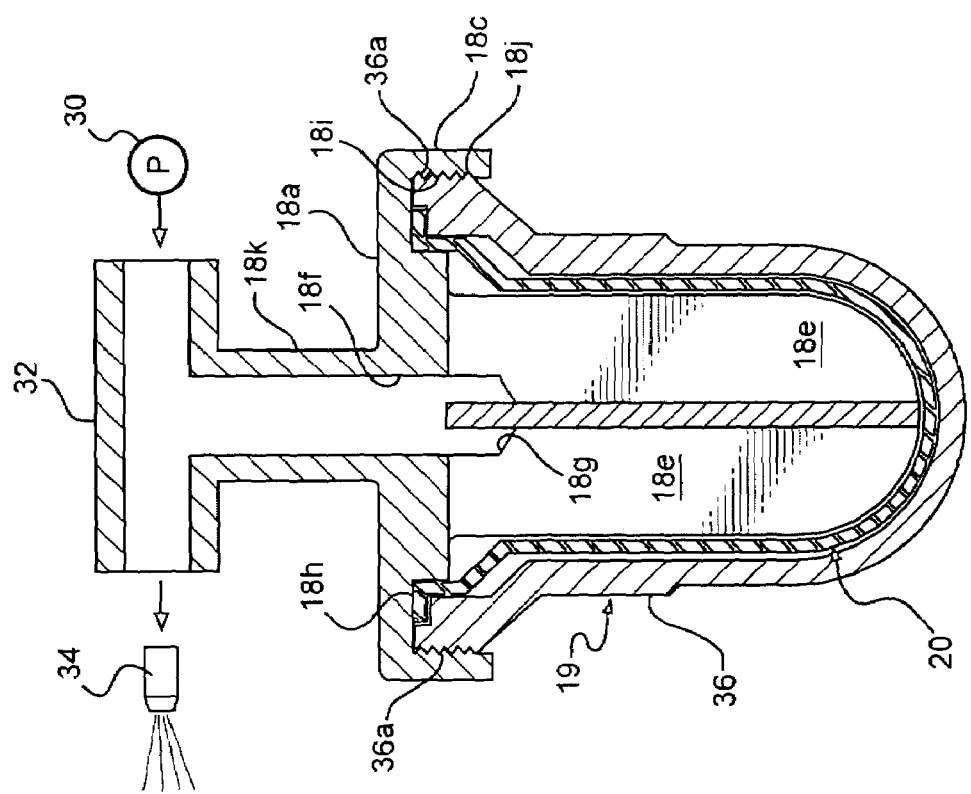

DIAPHRAGM ASSEMBLY

CROSS REFERENCE TO CO-PENDING APPLICATION

This application claims priority benefit of the filing date of U.S. provisional Patent Application Ser. No. 60/582,004, filed Jun. 22, 2004, the entire contents of which are incorporated herein by reference.

FIELD OF THE INVENTION

This invention relates to a hydraulic apparatus and more particularly to a diagram assembly especially suited for use in a hydraulic apparatus.

BACKGROUND

The present invention relates to a diaphragm for use in a master cylinder assembly of the type including a cylinder defining a pressure chamber and a reservoir port in communication with the pressure chamber, a piston mounted for reciprocal movement in the pressure chamber, and a reservoir in fluid communication with the pressure chamber of the cylinder. A diaphragm is typically employed in the reservoir to separate the reservoir into a liquid chamber in communication with the pressure chamber of the master cylinder and a gas chamber normally in communication with the atmosphere. The diaphragm forms an impervious barrier within the reservoir to keep liquid in the system and air out of the system; prevents moisture from entering the liquid; allows for expansion and contraction of the liquid under temperature variations; allows for variations in atmospheric conditions; and acts as a flexible medium to compensate for liquid flow into and out of the reservoir during actuation of the associated master cylinder and to compensate for changes in the volume of the liquid in the system due to wear in the system or system leakage.

Several forms of diaphragms have been used in the prior art.

One form of diaphragm in common usage has a generally top hat cross-sectional configuration. Whereas this diaphragm is satisfactory in some applications, it is capable of only a minor expansion relative to its total volume so that it is limited in its ability to compensate for under filling of the system, wear in the system, or leakage in the system.

Another form of diaphragm in common usage employs a pleated or bellows configuration. Whereas this type of diaphragm has a larger expansion capacity, it has a tendency to trap air between the pleats of the diaphragm as the diaphragm moves to a collapsed or contracted condition. This air can ultimately find its way into the master cylinder system. The pleated diaphragms are also subject to fatigue cracking at the crease points of the pleats.

Another form of diaphragm in popular usage includes a generally top had cross-sectional configuration with a rolled portion adjacent the upper end of the top hat. Whereas the rolled portion increases the capacity of the diaphragm as compared to the simple, top hat type diaphragm, the rolls tend to eventually fatigue at the crease points with consequent failure of the diaphragm.

Another form of prior art diaphragm includes a main body portion which, in a cross-section transverse to the central axis of the diaphragm, includes a plurality of radially extending circumferentially spaced arms arranged about the central axis. Whereas this arrangement provides a large expansion and contraction capacity, the arms have a tendency to become distorted or wrinkled during expansion and contraction with consequent derogation of the performance of the diaphragm and/or the wear life of the diaphragm.

SUMMARY OF THE INVENTION

This invention is directed to the provision of an improved diaphragm assembly for use in a hydraulic apparatus.

More specifically, this invention is directed to the provision of an improved diaphragm assembly for use in a hydraulic apparatus where an adequate expansion and contraction capacity is provided and wherein any tendency of the diaphragm to distort or wrinkle during expansion and contraction is effectively precluded.

The diaphragm assembly of the invention includes a cap formed of a rigid material and a diaphragm formed of an elastomeric material. According to the invention the diaphragm is generally tubular and includes an upper annular collar portion defining an open upper end of the diaphragm and a main body portion extending downwardly from the collar portion, defining a closed lower end of the diaphragm, and including, in cross-section, a plurality of hollow radially extending circumferentially spaced arms, and the cap includes an upper disc portion sized to receive the collar portion of the diaphragm and a rib portion extending downwardly from the disc portion and including, in cross-section, a plurality of radially extending circumferentially spaced arms positioned respectively within the arms of the main body portion of the diaphragm. This arrangement allows the elastomeric diaphragm to expand and contract to provide the desired expansion and contraction of the system volumes while effectively precluding wrinkling or distortion of the arms of the diaphragm during the expansion and contraction.

According to a further feature of the invention, the disc portion includes a central opening providing communication between the area above the disc portion and an area below the disc portion and between the disc portion arms. This arrangement allows proper breathing for venting of the interior of the diaphragm.

According to a further feature of the invention, the diaphragm assembly is intended for use with a housing having an upper annular rim and the disc portion of the cap includes means to facilitate securement to the upper annular rim of the housing with the main body portion of the diaphragm and the rib portion of the cap extending downwardly into the housing. This specific arrangement allows the diaphragm assembly of the invention to provide expansion and contraction in the reservoir of a hydraulic apparatus.

According to a further feature of the invention, the diaphragm main body portion and the rib portion arms have a cross configuration in cross-section. This specific geometric configuration has been found to facilitate ready manufacture and provide adequate expansion and contraction.

The invention also provides a hydraulic apparatus of the type including a hydraulic displacement mechanism including a housing having a pressure chamber and a discharge port for discharge of hydraulic fluid from the pressure chamber in response to actuation of the hydraulic displacement mechanism; a reservoir having a housing sidewall defining a cylindrical reservoir chamber including a discharge port communicating the reservoir chamber with the pressure chamber; and a diaphragm assembly positioned in the reservoir chamber and dividing the reservoir chamber into a liquid chamber portion on one side of the diaphragm and in communication with the reservoir discharge port and a gas chamber portion on the other side of the diaphragm and blocked from the reservoir discharge port by the diaphragm assembly. According to the invention, the reservoir assembly includes a cap formed of a rigid material and a diaphragm formed of an elastomeric material; the diaphragm is generally tubular and includes an upper annular collar portion defining an open upper end of the diaphragm and a main body portion extending downwardly from the collar portion, defining a closed lower end of the diaphragm, and including, in cross-section, a plurality of hollow radially extending circumferentially spaced arms; and the cap includes an upper disc portion sized to receive the collar portion of the diaphragm and a rib portion extending downwardly from the disc portion and including, in cross-section, a plurality of radially extending circumferentially spaced arms positioned respectively within the arms of the main body portion of the diaphragm. This specific diaphragm assembly construction provides a large expansion and contraction capacity with respect to each of the reservoir chambers while precluding undesired wrinkling or distortion of the arms of the diaphragm during the expansion and contraction.

According to a further feature of the invention, the disc portion includes a central opening providing communication between the area between the disc portion and area below the disc portion and between the disc portion arm. This arrangement provides ready communication with atmosphere with respect to the interior of the flexible diaphragm.

According to a further feature of the invention, the disc portion of the cap includes means to facilitate securement of the cap to an upper annular rim of the reservoir chamber with the main body portion of the diaphragm and the rib portion of the cap extending downwardly into the reservoir chamber. This arrangement provides a ready and convenient means of mounting the diaphragm assembly within the reservoir chamber.

According to a further feature of the invention, the diaphragm main body portion arms and the rib portion arms have a cross configuration in cross-section. This specific geometric arrangement provides ready manufacturability and provides adequate expansion and contraction capacity with respect to the diaphragm.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is a side view of the diaphragm;

FIG. 4 is a cross sectional view taken on line 4—4 of FIG. 3;

FIG. 5 is an exploded perspective view of the diaphragm assembly;

FIGS. 6, 7, and 8 are cross sectional views taken on lines 6/7/8—6/7/8 of FIG. 1;

FIG. 9 is a cross sectional view of a fuel delivery system employing a diaphragm assembly according to the invention; and FIG. 10 is a cross sectional view of a further diaphragm assembly.

DESCRIPTION OF THE PREFERRED EMBODIMENT

The invention diaphragm assembly is disclosed in FIGS. 1–8 for use in a hydraulic apparatus in the form of a master cylinder assembly and is disclosed in FIG. 9 for use in a motor vehicle fuel delivery system.

Figure 1:
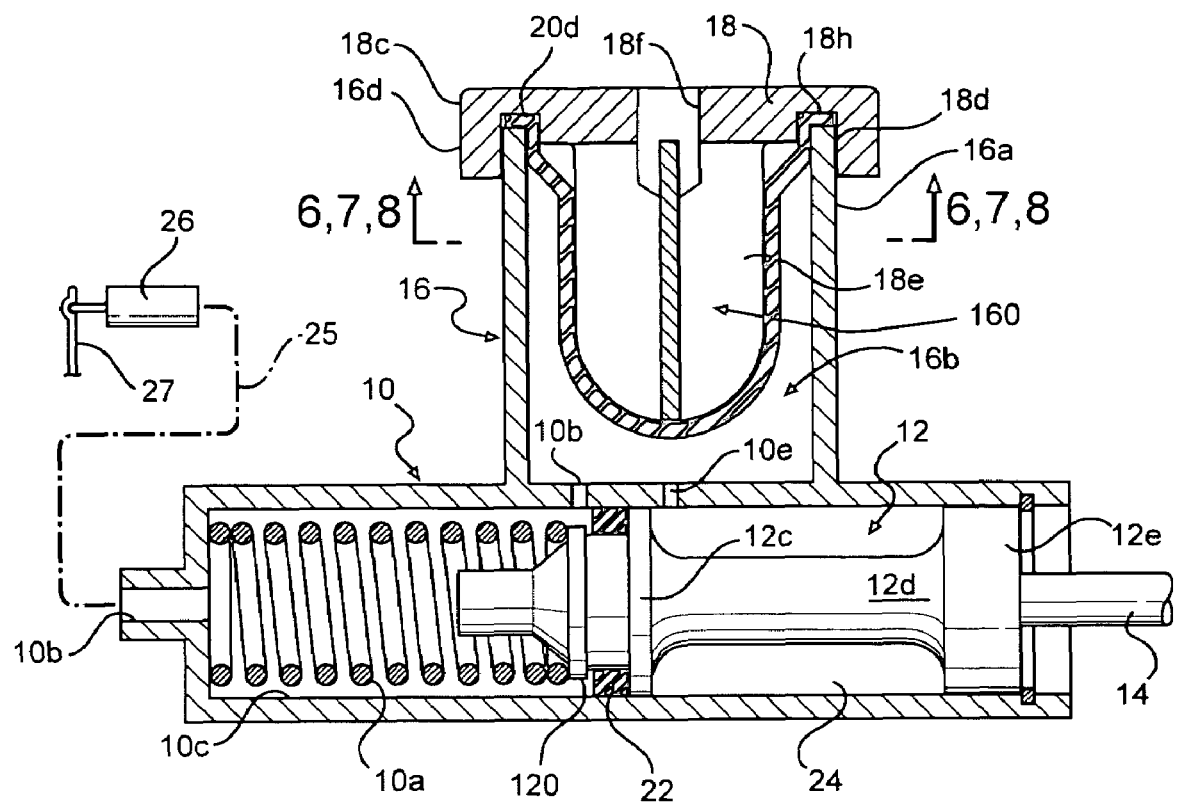
FIG. 1 is a cross sectional view of a master cylinder assembly employing a diaphragm assembly according to the invention.
Figure 2:
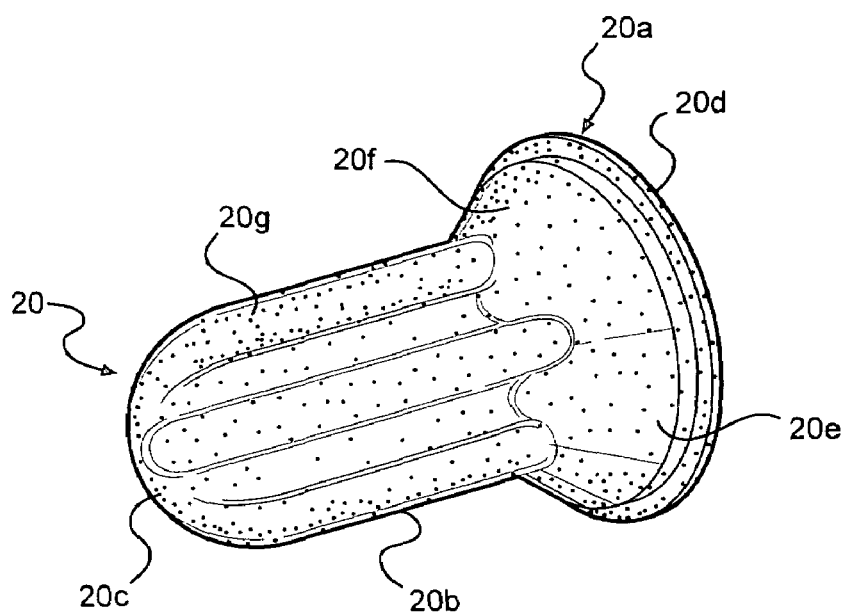
FIG. 2 is a perspective view of a diaphragm employed in the diaphragm assembly of FIG. 1.

The master cylinder assembly seen in FIG. 1 includes a cylinder 10 defining an internal bore 10a and a discharge port 10b at the forward end of the cylinder; a piston 12 mounted for reciprocal movement within the bore 10a and including a nose 12a, a flange 12b, a forward land 12c, a central reduced diameter spool portion 12d, and a rearward land 12e; a piston rod 14; a reservoir 16 formed integrally with cylinder 10 and open at its upper end 16a; a screw-on cap 18 threadably engagable with the upper end of the reservoir, and a diaphragm 20. Diaphragm 20 and cap 18 together comprise the diaphragm assembly 19 of the invention.

Diaphragm 20 is positioned within reservoir 16 and divides the chamber of the reservoir into a lower liquid chamber portion 16b, defined outside of the diaphragm, and an upper gas chamber portion 16c, defined within the diaphragm.

Lower liquid chamber portion 16b is in communication with a pressure chamber 10c defined forwardly of piston 12 through an orifice or port 10d and through a second orifice or port 10e. Orifice 10d is disposed immediately forwardly of an annular seal 22 disposed in a seal groove defined between piston flange 12b and piston land portion 12c so that pressure chamber 10c is in fluid communication with liquid chamber 16b of the reservoir with the piston in the extreme retracted position seen in FIG. 1 and so that the port 10d is immediately closed upon forward movement of the piston in response to actuation of the master cylinder to block communication between the pressure chamber and the reservoir as the piston moves through its forward working stroke. As the piston is thereafter retracted to its position in FIG. 1, port 10d is again opened to provide communication between fluid chamber 16b and pressure chamber 10c so as to allow compensating flow, if necessary, into the chamber 10c. Port 10e maintains constant communication between liquid chamber 16b and the area behind piston land portion 12c such that the annular chamber 24 defined around the piston spool portion 12d is always filled with hydraulic fluid, as is well-known in the art.

Diaphragm 20 is generally tubular and includes an open upper end and a blind or closed lower end. The diaphragm includes an annular mounting or collar portion 20a defining the open upper end of the diaphragm and a main body portion 20b extending downwardly from collar portion 20a to define the closed lower end 20c of the diaphragm. Collar portion 20a includes a lip 20d, an annular shoulder portion 20e, and a conical portion 20f. The diaphragm is mounted within reservoir 16 by clamping lip 20d between the upper annular edge of reservoir 16 and cap 18 with the main body of the diaphragm extending downwardly into the reservoir.

Main body portion 20b, in transverse cross section as seen in FIG. 6, includes a plurality of radially extending arms 20g arrayed symmetrically about the central axis 26 of the diaphragm. As disclosed, there are four circumferentially spaced arms 20g arranged symmetrically about the central axis of the diaphragm so as to define a cross configuration. The arms are defined by flutes 20h extending along the main body portion from conical portion 20f of the collar portion to the closed end 20c of the diaphragm and a series of rounded ridges 20i generally coextensive with the flutes and interconnecting the flutes to form the final cross configuration. Ridges 20i and flutes 20h each have an arcuate configuration and the centers and radii of the arcs are chosen such that the resulting arm has a generally pear-shaped, reentrant configuration with the larger, bulbous portion of the arm remote from the central diaphragm axis. The adjacent flutes and ridges will also be seen to coact to define pairs of side walls 20j and 20k, each defining an arm 20g with each side wall defined in part by a portion of a rounded ridge 20i and in part by a portion of an adjacent flute 20h.

Cap 18 is formed of a rigid plastics material and includes a main body disc portion 18a and a rib portion 18b extending downwardly from the disc portion.

Disc portion 18a has a circular configuration and includes a rim 18c having internal threads 18d for threaded coaction with external threads 16d at the upper end of reservoir 16.

Rib portion 18b has a cross configuration corresponding generally to the cross configuration of the diaphragm and specifically includes four ribs 18e. Rib portion 18b has an overall configuration generally corresponding to the overall configuration of the main body portion 20b of the diaphragm so that the rib arms 18e may respectively fit within the diaphragm arms 20j as best seen in FIG. 6.

Cap 18a includes a central aperture 18f and the upper radially inner portions of rib arms 18e are cut away at 18g to provide communication between the areas circumscribed by adjacent rib arms and aperture 18f. Aperture 18f and cut outs 18g will be seen to coact to communicate upper gas chamber portion 16c with atmosphere. Cap 18a further defines a downwardly opening annular groove 18h for receipt of diaphragm lip 20d to facilitate the seated clamping of the diaphragm within the reservoir utilizing the cap.

As best seen in FIGS. 7 and 8, the invention diaphragm may expand substantially from its relaxed or normal position of FIG. 6 and may contract substantially from its relaxed or normal configuration of FIG. 6.

Specifically, as seen in FIG. 7, the main body portion of the diaphragm, in its extreme expanded condition, may assume a circular configuration with the radius of the circle significantly exceeding the radius of the arms 20g with the diaphragm in its relaxed condition. In its extreme expanded condition, the diaphragm assumes a circular configuration having a diameter substantially approximating the diameter of shoulder portion 20e of collar portion 20a.

Conversely, in its extreme collapsed condition as seen in FIG. 8, the side walls 20j and 20k defining each arm collapse totally upon a respective rib arm 18e to substantially eliminate the gas chamber defined within the diaphragm. Whereas neither of these extreme conditions are typically ever achieved or utilized in the normal operation of the associated master cylinder assembly, the expanded and collapsed configurations as seen in FIGS. 7 and 8 illustrate the extreme variation in capacity provided by the invention diaphragm.

The invention diaphragm may be formed of any suitable impervious elastomeric material such, for example, as an ethylene propylene rubber material, a nitrile material, or a fluorosilicon material.

It will be understood that, in use, the invention diaphragm expands and contracts to selectively maintain a totally filled condition on the liquid side of the diaphragm. For example, the diaphragm is ordinarily utilized in a master and slave cylinder assembly in which the pressure fluid discharged from discharge port 10b is delivered by a conduit 25 to a slave cylinder 26 for use, for example, in actuating a clutch release member 27 of a motor vehicle. The master cylinder, conduit, slave cylinder, and reservoir are prefilled with hydraulic prior to delivery to the motor vehicle manufacturer. If the refill is somewhat less than the specified refill amount, the diaphragm automatically expands to provide a totally filled configuration on the liquid side of the diaphragm and, conversely, if the refill amount is in excess of the specified amount, the diaphragm automatically contracts to allow the overfill while maintaining a totally filled condition on the liquid side of the diaphragm. Similarly, as wear occurs in the system over extended period of usage, the diaphragm selectively contracts to maintain the totally filled condition of the liquid system and as leakage occurs in the system, the diaphragm similarly expands to maintain a totally filled liquid condition in the system. Further, as liquid flows into and out of the reservoir during the actuation of the associated master cylinder, the diaphragm selectively expands and contracts to maintain a completely liquid-filled condition on the liquid side of the diaphragm.

The invention diaphragm will be seen to provide many important advantages as compared to prior art diaphragms. Specifically, the invention diaphragm provides a high ratio as between the fully expanded and fully contracted volumes of the diaphragm so as to easily maintain a totally liquid-filled condition on the liquid side of the diaphragm in any operating condition encountered in the associated master cylinder assembly. Further, the invention diaphragm has a totally rounded configuration so as to avoid creasing and ultimate fatigue cracking at the crease points. Further, the invention diaphragm by virtue of the manner in which it moves between its fully collapsed and fully expanded conditions, totally avoids the problem of certain prior art diaphragms with respect to trapping air between portions of the diaphragm as the diaphragm moves to its collapsed condition.

As the diaphragm moves between its collapsed and expanded conditions, the rib arms 18e constrain and define the specific movement of the diaphragm arms and specifically act to preclude distortion or wrinkling of the diaphragm arms as the arms move between the various collapsed and expanded configurations.

The diaphragm assembly of the invention is seen in FIG. 9 utilized in a motor vehicle fuel delivery system including a fuel pump 30 delivering fuel via conduit 32 to a plurality of fuel injectors 34. In this embodiment the diaphragm assembly 19 is received in a cup 36 which may be wholly or partially emerged in liquid fuel contained in a suitable fuel tank of an associated vehicle. In this case the inner annular face 18i of the rim 18c of the main body cap portion 18a is ultrasonically welded to the outer annular face 36a of the upper end of the cup 36 and the main body cap portion 18 further includes an upstanding tubular portion 18k which communicates with opening 18f and with the fuel conduit 32.

In the use of the fuel delivery system of FIG. 9, the diaphragm 20 selectively expands and contracts. Specifically, the diaphragm expands in response to the system heat buildup or "heat soak" following engine shut down to allow fuel to flow into the diaphragm, whereby to minimize environmentally undesired fuel evaporation during the initial stages of shut down, and thereafter contracts as the system cools down so that conduit 32 is maintained in a totally full condition all the way up to the fuel injectors to facilitate morning engine start up and specifically to avoid a "long crank" requirement to deliver fuel to the fuel injectors.

As with the FIGS. 1–8 embodiment, the rib arms 18c function during expansion and contraction of the diaphragm to preclude distortion or wrinkling of the diaphragm arms.

The FIG. 10 embodiment is similar to the FIG. 9 embodiment except that the main body cap portion 18a includes an upstanding barbed connection 18l for receipt of a suitable hose and the lower end of cup 36 is provided with a similar downstanding barbed connection 36b for receipt of a further hose. Barbed connection 18l communicates with opening 18f and barbed connection 18m communicates with the area defined between diaphragm 20 and cup 36.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A diaphragm assembly including a cap formed of a rigid material and a diaphragm formed of an elastomeric material, characterized in that:
   the diaphragm is generally tubular and includes an upper annular collar portion defining an open upper end of the diaphragm and a main body portion extending downwardly from the collar portion, defining a closed lower end of the diaphragm, and including, in cross section, a plurality of hollow radially extending circumferentially spaced arms; and
   the cap includes an upper disc portion sized to receive the collar portion of the diaphragm and a rib portion extending downwardly from the disc portion and including, in cross-section, a plurality of radially extending circumferentially spaced arms positioned respectively within the arms of the main body portion of the diaphragm.

2. A diaphragm assembly according to claim 1 wherein the disc portion includes a central opening providing communication between an area above the disc portion and an area below the disc portion and between the disc portion arms.

3. A diaphragm assembly according to claim 1 wherein:
   the diaphragm assembly is intended for use with a housing having an upper annular rim; and
   the disc portion of the cap includes means to facilitate securement to the upper annular rim of the housing with the main body portion of the diaphragm and the rib portion of the cap extending downwardly into the housing.

4. A diaphragm assembly according to claim 1 wherein the diaphragm main body portion arms and the rib portion arms have a cross configuration in cross-section.

5. A hydraulic apparatus including a hydraulic displacement mechanism including a housing having a pressure chamber and a discharge port for discharge of hydraulic fluid from the pressure chamber in response to actuation of the hydraulic displacement mechanism; a reservoir having a housing sidewall defining a cylindrical reservoir chamber including a discharge port communicating the reservoir chamber with the pressure chamber; and a diaphragm assembly positioned in the reservoir chamber and dividing the reservoir chamber into a liquid chamber portion on one side of the diaphragm assembly and in communication with the reservoir discharge port and a gas chamber portion in the other side of the diaphragm assembly and blocked from the reservoir discharge port by the diaphragm assembly; characterized in that:
   the diaphragm assembly includes a cap formed of a rigid material and a diaphragm formed of an elastomeric material;
   the diaphragm is generally tubular and includes an upper annular collar portion defining an open upper end of the diaphragm and a main body portion extending downwardly from the collar portion, defining a closed lower end of the diaphragm, and including, in cross-section, a plurality of hollow radially extending circumferentially spaced arms; and
   the cap includes an upper disc portion sized to receive the collar portion of the diaphragm and a rib portion extending downwardly from the disc portion and including, in cross-section, a plurality of radially extending circumferentially spaced arms positioned respectively within the arms of the main body portion of the diaphragm.

6. A hydraulic apparatus according to claim 1 wherein:
   the disc portion includes a central opening providing communication between an area above the disc portion and an area below the disc portion and between the disc portion arms.

7. A hydraulic apparatus according to claim 1 wherein the disc portion of the cap includes means to facilitate securement to an upper annular rim of the reservoir housing with the main body portion of the diaphragm and the rib portion of the cap extending downwardly into the reservoir housing.

8. A hydraulic apparatus according to claim 1 wherein the diaphragm main body portion arms and the rib portion arms have a cross configuration in cross-section.

9. A hydraulic apparatus according to claim 1 wherein the hydraulic displacement mechanism comprises a master cylinder, the apparatus further includes a slave cylinder, the apparatus is intended for use by a motor vehicle manufacturer to actuate a motor vehicle control system, and the reservoir master cylinder and slave cylinder are prefilled with hydraulic fluid prior to deliver to the motor vehicle manufacturer.

10. A hydraulic apparatus according to claim 1 wherein the diaphragm arms are formed by a series of axially extending circumferentially spaced flutes along the main body portion with a series of rounded ridges interconnecting the flutes.

11. A hydraulic apparatus according to claim 6 wherein at least three arms are provided.

12. A hydraulic apparatus according to claim 7 wherein four arms are provided to define a cross-configuration.

13. A hydraulic apparatus according to claim 1 wherein the hydraulic displacement mechanism comprises a master cylinder assembly having a cylinder defining the pressure chamber and the discharge port and a piston mounted for reciprocation in the cylinder.

14. A hydraulic apparatus according to claim 9 wherein the reservoir is mounted directly to the cylinder and the discharge port opens directly in the pressure chamber.

* * * * *